United States Patent [19]

Völker et al.

[11] Patent Number: 4,978,791
[45] Date of Patent: Dec. 18, 1990

[54] SUBSTITUTED P,P'-METHYLENE-BIS-ANILINE

[75] Inventors: Theodor Völker, Reinach; Hans Althaus, Brig-Glis, both of Switzerland

[73] Assignee: Lonza Ltd., Gampel/Valais, Switzerland

[21] Appl. No.: 748,594

[22] Filed: Jun. 25, 1985

[30] Foreign Application Priority Data

Jul. 6, 1984 [CH] Switzerland ............... 3281/84

[51] Int. Cl.$^5$ ........................................... C07C 211/56
[52] U.S. Cl. .................................. 564/335; 564/330; 564/331; 564/333
[58] Field of Search ............... 564/330, 331, 333, 335

[56] References Cited

U.S. PATENT DOCUMENTS

| | | |
|---|---|---|
| 3,203,932 | 8/1965 | Frisch . |
| 3,322,810 | 5/1967 | Olin . |
| 3,427,282 | 2/1969 | Sundholm . |
| 3,428,610 | 2/1969 | Klebert . |
| 3,804,806 | 4/1974 | Grivas .......................... 564/333 |
| 3,857,890 | 12/1974 | Recchia et al. . |
| 4,469,653 | 9/1984 | Nissen .......................... 264/51 |

FOREIGN PATENT DOCUMENTS

| | | |
|---|---|---|
| 714092 | 7/1965 | Canada . |
| 0088667 | 9/1983 | European Pat. Off. ............. 564/330 |
| 171588 | 7/1985 | European Pat. Off. . |
| 220641 | 10/1986 | European Pat. Off. . |
| 1240654 | 5/1965 | Fed. Rep. of Germany . |
| 2239237 | 2/1974 | Fed. Rep. of Germany . |
| 3126435 | 1/1983 | Fed. Rep. of Germany . |
| 2054814 | 4/1971 | France . |

OTHER PUBLICATIONS

Proc. Nat. Acad. Sci, U.S.A., vol. 70, No. 3, p. 782 FF and No. 8, p. 2281 FF, Ames et al.
Proc. Nat. Acad., Sci., U.S.A., vol. 70, No. 8, pp. 2281-2285, Aug., 1973, Aus: Ullmanns Encyklopadie der technischen Chemi, 4.Auflage, Band 10, 1975.
Derwent Abstract: 521605, (Corresponding to FR 2054814), 1971.

National Cancer Institute, *Carcinogenesis–Technical Report Series*, No. 142 (1979).
Rao et al., *Archives of Toxicology*, (1982), 49, pp. 185–190.

*Primary Examiner*—Charles F. Warren
*Attorney, Agent, or Firm*—Fisher, Christen & Sabol

[57] ABSTRACT 2,2'-Dichloro-6,6'-diethylmethylene-bis-aniline or mixtures thereof with compounds of the formula:

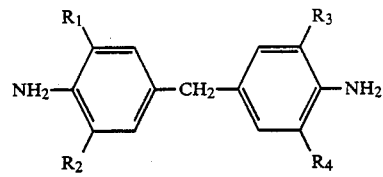

wherein $R_1$, $R_2$, $R_3$ and $R_4$ are the same or different and are straight-chained or branched alkyl radicals having 2 to 4 C atoms, or $R_1$ and/or $R_3$ are chlorine and the remaining R's have the above-mentioned significance, as chain-extension means or cross-linkage means for polyurethanes or epoxide resins. Process for the production of 2,2'-dichloro-6,6'-diethylmethylene-bis-aniline or such mixtures. 2-ethyl-6-chloroaniline is condensed with itself or an aniline having the formula:

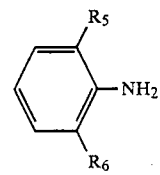

wherein $R_5$ and $R_6$ are the same or different and are straight-chained or branched having 2 to 4 C atoms, with the proviso that $R_5$ can also be chlorine, in acidic medium with formaldehyde or compounds which form formaldehyde. The compounds in the mixture can be condensation products of two molecules of such aniline derivatives.

11 Claims, No Drawings

SUBSTITUTED P,P'-METHYLENE-BIS-ANILINE

BACKGROUND OF THE INVENTION

1. Field of the Invention

The invention relates to new Ames-test-negative chain-extension agents or cross-linking agents for polyurethane resins and epoxide resins.

2. Prior Art

The production of polyurethanes according to the isocyanate poly-addition process is known. For example, compounds having hydrogen atoms capable of reaction, such as, polyesters with terminal OH groups, are reacted with diisocyanate to form a prepolymer (German Patent Application No. 1,240,654), which are then made in a second step to react at an elevated temperature with a chain-extension agent or cross-linking agent, which is customarily an aromatic diamine. The developing reaction mass, which is capable of being poured, can then be hardened in a mold over an extended period of time. In that case, it is a prerequisite that all of the prepolymer and the chain extension agents or cross-linking agents do not react too quickly in order that a proper processing time is guaranteed in the fluid phase. For this purpose, the following slow-acting diamines, o-chlorobenzidine, 2,5-dichloro-1,4-phenylene-diamines and especially 3,3'-dichloro-4,4'-diaminodiphenyl methane (MOCA), have proven to be useful.

The production of epoxide resins likewise takes place in a known manner. For example, one can proceed in such a way that an active hydrogen compound, such as, alcohols, phenols or acids, is added to a monoepoxy compound while forming chlorohydrine derivatives, which are then converted to glycidyl compounds under HCl-separation. The latter form the basis for the further conversion into epoxide resins using hardeners, such as, anhydrides, diamines or polyamines (*Ullmanns Encyclopedia of Technical Chemistry*, 4th Edition, Vol. 10, pp 563 et seq.). The diamines, especially methylene dianiline (MDA) and 3,3'-dichloro-4-4'-diaminodiphenylmethane (MOCA), have been shown to be especially useful for this purpose.

The carcinogeneous and mutagenous characteristics of the hitherto known diamines, which are chain-extension agents or cross-linking agents, are considerable disadvantages. Above all, 3,3'-dichloro-4,4'-diaminodiphenylmethane (MOCA) and methylene dianiline (MDA), have been used on a not very willingly basis because of their suspected carcinogeneous [i.e., Ames-test-positive, see AMES ET AL., PROC. NAT. ACAD. SCI, USA, VOL. 70, 1973, No. 3, pages 782 ff, and No. 8, pages 2281 ff]—their use has even been prohibited in some countries.

A further negative factor is the fact that by the selection of the chain-extension agent or cross-linking agent, the pot time of the elastomer is fixed and can not be varied within a wide range depending upon the use of the elastomer.

BROAD DESCRIPTION OF THE INVENTION

An object of the invention is to provide an amine compound, amine composition, and production process and use process therefor which do not possess the above-mentioned prior art disadvantages. Other objects and advantages of the invention are set out herein or are obvious herefrom to one skilled in the art.

The objects and advantages of the invention are achieved by the compound, compositions and processes of the invention.

The invention involves 2,2'-dichloro-6,6'-diethyl-methylene-bis-aniline or a mixture thereof with at least one compound having the formula:

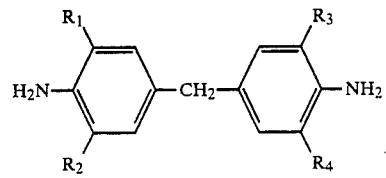

wherein $R_1$, $R_2$, $R_3$, $R_4$ are the same or different and are straight-chained or branched alkyl radicals having 2 to 4 carbon atoms, or $R_1$ and/or $R_3$ are chlorine and the remaining Rs have the above-mentioned definition. Such aniline or mixtures are useful as Ames-test-negative chain-extension agents or cross-linking agents for polyurethane and epoxide resins.

The invention further involves a process for the production of the compound and mixtures of the invention by the condensation of 2-ethyl-6-chloroaniline and at least one aniline having the formula:

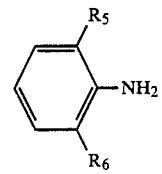

wherein $R_5$ and $R_6$ are the same or different and are straight-chained or branched alkyl radicals having 2 to 4 carbon atoms, with formaldehyde or at least one compound which forms formaldehyde in an acidic medium. 2,2'-dichloro-6,6'-diethylmethylene-bis-aniline results from the condensation of two molecules of the 2-ethyl-6-chloroaniline in an acidic medium with the formaldehyde or compound which forms formaldehyde. The anilines which have both $R_1$ and $R_3$ as chlorine are formed from two molecules of the aniline derivatives wherein $R_5$ is chlorine.

Effective compounds which can occur in the mixture additionally to the 2,2'-dichloro-6,6'-diethylmethylene-bis-aniline, are for example:

TABLE I

| Compounds | Ames-Test |
|---|---|
| 2,6,2'-triethyl-6'-chloro-methylene-bis-aniline | — |
| 2,2',6,6'-tetraethyl-methylene-bis-aniline | — |
| 2,2'-diethyl-6-sec.butyl-6'-chloro-methylene-bis-aniline | — |
| 2,6,2'-triethyl-6'-sec.butyl-methylene-bis-aniline | — |
| 2,2'-diethyl-6,6'-di-sec.butyl-methylene-bis-aniline | — |
| 2-ethyl-6-chloro-2',6'-diisopropyl-methylene-bis-aniline | — |
| 2,6,2',6'-tetraisopropyl-methylene-bis-aniline | — |
| 2,6-diethyl-2',6'-diisopropyl-methylene-bis-aniline | — |

DETAILED DESCRIPTION OF THE INVENTION

As used herein, all parts, ratios, percentages and proportions are on a weight basis unless otherwise stated herein or otherwise obvious herefrom to one ordinarily skilled in the art. Also, as used herein, all temperatures are in degrees Centigrade.

The production of the 2,2'-dichloro-6,6'-diethyl-methylene-bis-aniline or the invention mixtures can take place by the condensation of 2-chloro-6-ethylaniline and dialkyl (or monoalkylmonochloro) anilines of the formula:

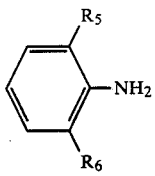

wherein $R_5$ and $R_6$ have the above-stated definition, with formaldehyde or a formaldehyde-forming compound, such as, paraformaldehyde, in the presence of an acidic medium.

Effectively, at least 30 mole percent, preferably at least 80 mole percent, of 2-chloro-6-ethyl aniline is used for the condensation of mixtures with dialkyl aniline of the above-mentioned formula. Formaldehyde is used effectively in a quantity of 0.4 to 0.75 mole, preferably in a quantity of 0.45 to 0.55 mole, per mole of the initial amines. To achieve an acid medium, effectively an inorganic acid, such as, sulfuric acid, is added.

The application of the condensates according to the invention depends on the quantity as well as on the manner of the addition according to the characteristics of the pertinent starting products and according to the type of the end products to be processed.

The incorporation of the Ames-test-negative chain-extension agent or cross-linking agent according to the invention into polyurethanes can take place according to any manner or method customary or known for polyurethane production, for example, by way of the reaction-injection molding process (RIM), or the speading or dipping process, with the customary reaction systems of polyisocyanates, polyhydroxy compounds, catalysts and additional additives. Suitable polyisocyanates for this purpose are aromatic polyisocyanates, such as, methylene phenylene diisocyanate (MDI), tolylene diisocyanate (TDI), naphthaline diisocyanate (NDI), or aliphatic and cycloaliphatic polyisocyanates, such as, isophorone diisocyanate or hexamethylene diisocyanate. Suitable polyhydroxy compounds are, for example, polyglycol, polyether polyols and polyester-polyols. Also all other suitable catalysts, such as, tetramethylbutanediamine (TMBDA), diazabicyclooctane (DABCO) and dibutyl tin dilaurate (DBTC) or combinations of these catalysts and additions such as softeners, driving agents, flame retardant agents, etc., are used.

The chain-extension agents or cross-linking agents of the invention are added effectively in a quantity of 0.4 to 0.6 mole, preferably in a quantity of 0.5 mole, per mole of NCO groups, that is to say, in an equivalent quantity to the reaction system with prepolymers, respectively, proportionally together with the polyols.

The reaction systems can be processed according to a process customary or known for polyurethanes. Thus, one can operate according to the one-shot process or according to the prepolymer process.

As a result of the variation of the compositions of the mixture of the Ames-test-negative chain-extension agents or cross-linking agents according to the invention in the reaction system, the pot time, that is to say, the time T, can be relatively changed until the polyurethane reaction mixture draws threads evenly and horizontally on a dipped-in spatula moved The following table shows the influence of various effective invention compounds of the Ames-test-negative chain-extension agents or cross-linking agents to the pot time T in comparison with chain-extension agents or cross-linking agents of the above-described prior art in a standard polyurethane elastomer:

TABLE 2

| Designation of the product | Ames-test | Remarks | T in sec. | Optimal Hardening temp. |
|---|---|---|---|---|
| diethyltoluoyl-diamine | + | comparative substance | 9 | — |
| 2,2',6,6'-tetra-ethyl-methylene-bis-aniline | — | comparative substance | 5 | — |
| 2,2',6,6'-tetra-isopropyl-methylene-bis-aniline | — | comparative substance | 9 | — |
| 2,2'-diethyl-6,6'-di-sec.butyl-methylene-bis-aniline | — | comparative substance | 12 | — |
| 2,2'-dichloro-methylene-bis-aniline (MOCA) | + | comparative substance | 105 | 70° C. |
| condensate no. 1 | — | substance according to invention | 38 | 70° C. |
| condensate no. 2 | — | substance according to invention | 40 | 70° C. |
| condensate no. 3 | — | substance according to invention | 13 | 70° C. |
| condensate no. 4 | — | substance according to invention | 15 | 45° C. |
| condensate no. 5 | — | substance according to invention | 11 | 45° C. |
| condensate no. 6 | — | substance according to invention | 10 | 45° C. |
| condensate no. 7 | — | substance according to invention | 10 | 45° C. |
| condensate no. 8 | — | substance according to invention | 50 | 40° C. |
| condensate no. 9 | — | substance according to invention | 40 | 40° C. |
| condensate no. 10 | — | substance according to invention | 60 | 40° C. |
| condensate no. 11 | — | substance according to invention | 82 | 70° C. |

TABLE 2-continued

| Designation of the product | Ames-test | Remarks | T in sec. | Optimal Hardening temp. |
|---|---|---|---|---|
| | | tion | | |

Preferably, condensate no. 1 is used.

When the invention agents are incorporated into a standard polyurethane elastomer, products can be obtained which are still processable at 70° C. on all commonly-used machines.

Moreover, these products have the following advantageous physical characteristics (as compared to MOCA):

TABLE 3

| Characteristic test | with MOCA | with condensate no. 1 | Remarks |
|---|---|---|---|
| Shore hardness D | 54 | 53 | |
| tensil stress N/mm² | | | |
| up to tearing | 28.20 | 27.32 | |
| up to 3% stretch | 5.54 | 6.09 | with condensate no. 1, 15 to 20 percent more chargeable |
| up to 5% stretch | 6.42 | 7.44 | |
| up to 7% stretch | 7.11 | 8.36 | |
| up to 10% stretch | 7.38 | 9.24 | |
| up to 100% stretch | 15.42 | 16.39 | |
| elongation at break N/mm² | 236 | 246 | |
| "firmness of structure" | | | |
| ambient temperature | 75 | 51 | with condensate no. 1, at rising temperature more sturdy in structure beginning with 70° C. superior as compared to MOCA |
| 70° C. | 43 | 44 | |

The chain-extension agents or cross-linking agents according to the invention can also be used advantageously as amine hardeners for expoxide resins. The incorporation of the amine hardeners into customary resins such as are formed, for example, from bis-phenol A and epichlorohydrine can be accomplished in a customary or known manner. Effectively, the amine hardeners are added in a quantity of 0.2 to 0.4 equivalent, per equivalent to preferably 0.25 equivalents of epoxy groups in the epoxide resin.

As a result of the use of the Ames-test-negative amine hardeners according to the invention, hardened epoxide resins are achieved with heat stability of shape which is comparable with epoxide resins obtained with the hardeners MOCA and MDA (which are known to be cancerogenic and mutagenic):

TABLE 4

| Diamine | Ames-test | Heat Stability of Shape °C. in Epon ® 828 | Remarks |
|---|---|---|---|
| methylene-bis-aniline (MDA) | + | 158° | comparison |
| 2,2'-dichloro-methylene-bis-aniline (MOCA) | + | 155° | comparison |
| condensate no. | − | 159° | invention |

TABLE 4-continued

| Diamine | Ames-test | Heat Stability of Shape °C. in Epon ® 828 | Remarks |
|---|---|---|---|
| 11 | | | |

By way of summary, the invention involves new p,p'-methylene-bis-anilines which are useful as chain-extension agents or cross-linking agents for polyurethanes and epoxide resins.

EXAMPLE 1

Production Of The Condensates According To The Invention.

Always 1 mole of 2-ethyl-6-chloroaniline, or a mixture of it with o-alkylized aromatic amines, was diluted with xylene at a weight ratio of 1:1, was mixed with 3 g or 33 g of 47.8 percent sulfuric acid (33 g was needed in the case of the condensation reaction with diisopropyl aniline) and was brought to reaction with 47.1 g of 30 percent formaldehyde solution (formaline) (which equals 0.472 mole) while stirring and with reflux for 6 hours. It was neutralized with caustic soda solution in excess and was stirred under reflux for an additional 30 minutes. After phase separation at 50° C., the organic phase was washed out once more with 150 ml of water and was separated at 50° C. At about 100 torr, the xylene isomer mixture was now first decanted and the unreacted aniline derivatives were finally removed at a flask temperature of 220° C. and 5 torr. The isolated yields of methylene-bis-compounds were all at above 97 percent of theory or of the $CH_2O$ used.

Condensate no. 1

92.2 mole of 2-ethyl-6-chloroaniline (CEA) and 7.8 mole percent of 2,6-diethylaniline (DEA) were subjected to condensation in the presence of formaldehyde. A light brown product having a melting range of 100° to 105° C. was obtained with the following composition expressed in mole percent:

| | |
|---|---|
| 2,2'-diethyl-6,6'-dichloromethylene-bis-aniline | 89.3 |
| 2,6,2'-triethyl-6'-chloromethylene-bis-aniline | 10.1 |
| 2,6,2',6'-tetraethylmethylene-bis-aniline | 0.65 |

The product showed no mutagenic effect in the Ames-test.

Condensate no. 2

89.6 mole percent of CEA and 10.4 mole percent of DEA were subjected to condensation in the presence of formaldehyde. A brown colored crystalline product having a melting range of 95° to 100° C. was obtained with the following composition expressed in mole percent:

| | |
|---|---|
| 2,2'-diethyl-6,6'-dichloromethylene-bis-aniline | 80.3 |
| 2,6,2'-triethyl-6'-chloromethylene-bis-aniline | 18.6 |
| 2,6,2',6'-tetraethylmethylene-bis-aniline | 1.1 |

The product showed no mutagenic effect in the Ames-test.

Condensate no. 3

79.7 mole percent of CEA and 20.3 mole percent of DEA were subjected to condensation in the presence of formaldehyde. A light brown product having a melting range of 91° to 100° C. was obtained with the following composition expressed in mole percent:

| | |
|---|---|
| 2,2'-diethyl-6,6'-dichloromethylene-bis-aniline | 73.9 |
| 2,6,2'-triethyl-6'-chloromethylene-bis-aniline | 21.1 |
| 2,6,2',6'-tetraethylmethylene-bis-aniline | 5.0 |

The product showed no mutagenic effect in the Ames-test.

Condensate no. 4

70.3 mole percent of CEA and 29.7 mole percent of DEA were subjected to condensation in the presence of formaldehyde. A light brown product having a melting range of 83° to 94° C. was obtained with the following composition expressed in mole percent:

| | |
|---|---|
| 2,2'-diethyl-6,6'-dichloromethylene-bis-aniline | 56.7 |
| 2,6,2'-triethyl-6'-chloromethylene-bis-aniline | 32.6 |
| 2,6,2',6'-tetraethylmethylene-bis-aniline | 10.7 |

The product showed no mutagenic effect in the Ames-test.

Condensate no. 5

64.0 mole percent of CEA and 36.0 mole percent of DEA were subjected to condensation in the presence of formaldehyde. A light brown product having a melting range of 78° to 91° C. was obtained with the following composition expressed in mole percent:

| | |
|---|---|
| 2,2'-diethyl-6,6'-dichloromethylene-bis-aniline | 43.3 |
| 2,6,2'-triethyl-6'-chloromethylene-bis-aniline | 42.5 |
| 2,6,2',6'-tetraethylmethylene-bis-aniline | 14.2 |

The product showed no mutagenic effect in the Ames-test.

Condensate no. 6

55.3 mole percent of CEA and 44.7 mole percent of DEA were subjected to condensation in the presence of formaldehyde. A light brown product having a melting range of 70° to 73° C. was obtained with the following composition expressed in mole percent:

| | |
|---|---|
| 2,2'-diethyl-6,6'-dichloromethylene-bis-aniline | 26.6 |
| 2,6,2'-triethyl-6'-chloromethylene-bis-aniline | 54.9 |
| 2,6,2',6'-tetraethylmethylene-bis-aniline | 18.4 |

The product showed no mutagenic effect in the Ames-test.

Condensate no. 7

39.8 mole percent of CEA and 60.2 mole percent of DEA were subjected to condensation in the presence of formaldehyde. A brown product having a melting range of 73° to 74° C. was obtained with the following composition expressed in mole percent:

| | |
|---|---|
| 2,2'-diethyl-6,6'-dichloromethylene-bis-aniline | 12.0 |
| 2,6,2'-triethyl-6'-chloromethylene-bis-aniline | 59.0 |
| 2,6,2',6'-tetraethylmethylene-bis-aniline | 29.0 |

The product showed no mutagenic effect in the Ames-test.

As a standard starting mixture (if not otherwise stated) for the following condensation reactions, a mixture of:

90 parts of 2-ethyl-6-chloroaniline (89.6 mole percent) and 10 parts of 2,6-diethylaniline (10.4 mole percent) was used.

Condensate no. 8

100 parts of the standard starting mixture was mixed with 40 parts of 2-ethyl-6-sec.butyl aniline and condensed with formaldehyde. The final product had the following composition expressed in mole percent:

| | |
|---|---|
| 2,2'-diethyl-6,6'-dichloro-methylene-bis-aniline | 43.7 |
| 2,6,2'-triethyl-6'-chloro-methylene-bis-aniline | 10.6 |
| 2,2'-diethyl-6-sec.butyl-6'-chloro-methylene-bis-aniline | 34.2 |
| 2,6,2',6'-tetraethyl-methylene-bis-aniline | 0.6 |
| 2,6,2'-triethyl-6'-sec.butyl-methylene-bis-aniline | 4.1 |
| 2,2'-diethyl-6,6'-di-sec.butyl-methylene-bis-aniline | 6.7 |

The product showed no mutagenic effect in the Ames-test.

Condensate no. 9

100 parts of the standard starting mixture was mixed with 80 parts of 2-ethyl-6-sec.butyl aniline and condensed with formaldehyde. The resultant mixture had a content of 2-ethyl-6-chloroaniline of 52.3 mole percent. The final product had the following composition expressed in mole percent:

| | |
|---|---|
| 2,2'-diethyl-6,6'-dichloro-methylene-bis-aniline | 27.6 |
| 2,6,2'-triethyl-6'-chloro-methylene-bis-aniline | 6.7 |
| 2,2'-diethyl-6-sec.butyl-6'-chloro-methylene-bis-aniline | 43.2 |
| 2,6,2',6'-tetraethyl-methylene-bis-aniline | 0.4 |
| 2,6,2'-triethyl-6'-sec.butyl-methylene-bis-aniline | 5.3 |
| 2,2'-diethyl-6,6'-di-sec.butyl-methylene-bis-aniline | 16.9 |

The product showed no mutagenic effect in the Ames-test.

Condensate no. 10

100 parts of the standard starting mixture was mixed with 20 parts of 2,6-diisopropyl aniline and condensed with formaldehyde. The end product had the following composition expressed in mole percent:

| | |
|---|---|
| 2,2'-diethyl-6,6'-dichloro-methylene-bis-aniline | 57.6 |
| 2,6,2'-triethyl-6'-chloro-methylene-bis-aniline | 14.0 |
| 2-ethyl-6-chloro-2',6'-diisopropyl-methylene-bis-aniline | 22.6 |
| 2,6,2',6'-tetraethyl-methylene-bis-aniline | 0.8 |
| 2,6,2',6'-tetraisopropyl-methylene-bis-aniline | 2.2 |
| 2,6-diethyl-2',6'-diisopropyl-methylene-bis-aniline | 2.7 |

The product showed no mutagenic effect in the Ames-test.

Condensate no. 11

2-Chloro-6-ethyl aniline was condensed with formaldehyde. The obtained 2,2'-dichloro-6,6'-diethyl-methylene-bis-aniline had a melting point of 112° C. and was negative in the Ames-test.

Determination of the "pot time" in polyurethane elastomer compositions:

1 mole of polytetramethylene glycol (MG 1000) was heated to 80° C. and was evacuated and dehydrated while stirring for 2 hours at a pressure of 12 mm Hg. Subsequently 2.1 mole of molten methylene diphenyl diisocyanate (so-called MDI pure) with a melting point of 40° C. was added at 45° to 50° C. and was brought to reaction under nitrogen while stirring at 80° C. The prepolymer obtained with an NCO content of 6 percent was degassified in a water jet vacuum for 1 hour at 60° C. prior to its use. This prepolymer was mixed with an equal molar quantity of diamine (or condensate) and was stirred evenly with a spatula for 10 seconds at 50° C. The reaction mixture was poured into an aluminum mold preheated to 100° C. (inside mass 120×10×5 mm). The time in seconds (T), until the mixture drew threads on an evenly-dipped-in spatula, was designated herein as "pot time" (the results are given in Table 2).

The test as hardening agent for epoxide resins:

As the epoxide resin, Epon ® 828 (manufacturer SHELL Chemical Co.) was used which is obtained from epichlorohydrine and bis-phenyl H and has an epoxide-equivalent weight of 190 (MG approx. 380). The equivalent weights of the amine hardeners were calculated by dividing their molar weights by 4 (corresponding to the 4 active H atoms). Thus, the equivalent of the above-described 2,2'-diethyl-6,6'-dichloro-methylene-bis-aniline (condensate no. 6) amounted to about 80.8 g. The resin (Epon ® 828), heated to 80° C., and the molten hardener were mixed, were degassified by centrifuging and were finally poured into a mold, the inside mass of which amounted to 178×12.7×12.7 mm. The resin-hardener-mixtures were heated over a 2-hour period to 100° C.; they were hardened afterwards during a 1-hour period of heating to 175° C. The hardened formed pieces were tested for their heat form stability according to the ASTM-method D 648-56 (the results are given in Table 4).

What is claimed is:

1. 2,2'-dichloro-6,6'-diethylmethylene-bis-aniline or a mixture thereof with at least one compound having the formula:

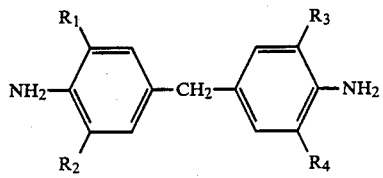

wherein $R_1$, $R_2$, $R_3$ and $R_4$ are the same or different and are straight-chained or branched alkyl having 2 to 4 C atoms, or $R_1$ and/or $R_3$ are chlorine and the remaining of $R_1$, $R_2$, $R_3$ and $R_4$ have the above-described definition, which is useful as chain-extension means or cross-linkage means for polyurethane of epoxide resins, respectively.

2. Mixture as claimed in claim 1 wherein said compound is 2,6,2'-triethyl-6'-chloro-methylene-bis-aniline.

3. Mixture as claimed in claim 1 wherein said compound is 2,2',6,6'-tetraethyl-methylene-bis-aniline.

4. Mixture as claimed in claim 1 wherein said compound is 2,2'-diethyl-6-sec.butyl-6'-chloro-methylene-bis-aniline.

5. Mixture as claimed in claim 1 wherein said compound is 2,6,2'-triethyl-6'-sec.butyl-methylene-bis-aniline.

6. Mixture as claimed in claim 1 wherein said compound is 2,2'-diethyl-6,6'-di-sec.butyl-methylene-bis-aniline.

7. Mixture as claimed in claim 1 wherein said compound is 2-ethyl-6-chloro-2',6'-diisopropyl-methylene-bis-aniline.

8. Mixture as claimed in claim 1 wherein said compound is 2,6,2',6'-tetraisopropyl-methylene-bis-aniline.

9. Mixture as claimed in claim 1 wherein said compound is 2,6-diethyl-2',6'-diisopropyl-methylene-bis-aniline.

10. 2,2'-dichloro-6,6'-diethylmethyl-bis-aniline.

11. A mixture of 2,2'-dichloro-6,6'diethylmethylene-bis-aniline and at least one compound having the formula:

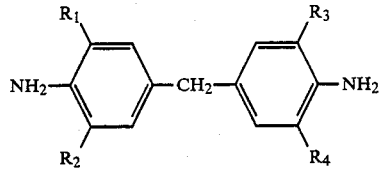

wherein $R_1$, $R_2$, $R_3$ and $R_4$ are the same or different and are straight-chained or branched alkyl having 2 to 4 C atoms, or $R_1$ and/or $R_3$ are chlorine and the remaining of $R_1$, $R_2$, $R_3$ and $R_4$ have the above-described definition.

* * * * *